United States Patent
Gubbi Lakshminarasimha et al.

(10) Patent No.: US 12,504,493 B2
(45) Date of Patent: Dec. 23, 2025

(54) METHOD AND SYSTEM FOR QUANTITATIVE SUSCEPTIBILITY MAPPING RECONSTRUCTION IN LOW-FIELD MAGNETIC RESONANCE IMAGING (MRI) SYSTEM

(71) Applicant: Tata Consultancy Services Limited, Mumbai (IN)

(72) Inventors: Jayavardhana Rama Gubbi Lakshminarasimha, Bangalore (IN); Viswanath Pamulakanty Sudarshan, Bangalore (IN); Arpan Pal, Kolkata (IN); Pavan Kumar Reddy Kancham, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 410 days.

(21) Appl. No.: 18/175,506

(22) Filed: Feb. 27, 2023

(65) Prior Publication Data

US 2023/0305089 A1   Sep. 28, 2023

(30) Foreign Application Priority Data

Mar. 28, 2022   (IN) .............................. 202221017927

(51) Int. Cl.
  *A61B 5/055*   (2006.01)
  *G01R 33/56*   (2006.01)
  *G06T 11/00*   (2006.01)

(52) U.S. Cl.
  CPC ........ *G01R 33/5608* (2013.01); *G06T 11/005* (2013.01); *G06T 2210/41* (2013.01); *G06T 2211/424* (2013.01)

(58) Field of Classification Search
  CPC .......................... G01R 33/5608; G01R 33/443; G01R 33/445; G06T 2210/41; A61B 5/055; A61B 5/0042
  See application file for complete search history.

(56) References Cited

U.S. PATENT DOCUMENTS

2015/0310639 A1   10/2015   Bilgie et al.
2022/0283256 A1*   9/2022   Granziera .............. G01R 33/50

OTHER PUBLICATIONS

Ramin Eslami et al., "Robust Reconstruction of MRSI Data Using a Sparse Spectral Model and High Resolution MRI Priors Title of the item: IEEE Transactions on Medical Imaging," 2010, vol. 29, Issue: 6, pp. 1297-1309, IEEE, https://user.engineering.uiowa.edu/~jcb/Papers/TMI10.pdf.

* cited by examiner

*Primary Examiner* — Kent Yip
(74) *Attorney, Agent, or Firm* — Finnegan, Henderson, Farabow, Garrett & Dunner, LLP

(57) ABSTRACT

State of the art systems being used for QSM reconstruction have explored prior information from both magnitude and phase data. However, the underlying assumption is that the susceptibility maps and the magnitude images have coinciding edges. Establishing the ground-truth susceptibility maps is difficult and leads to limited applicability of supervised methods. Further, with portable MRI machines becoming a reality, low-field imaging is getting more prominence, which brings in several associated challenges due to noise and external interference. The disclosure herein generally relates to magnetic resonance imaging (MRI) imaging systems, and, more particularly, to a method and system for quantitative susceptibility mapping (QSM) reconstruction in magnetic resonance imaging (MRI) systems. The system performs an iterative reconstruction of QSM, wherein in each iteration the reconstructed QSM from previous iteration is refined by comparing with a reference image generated using same subject's prior MRI data.

6 Claims, 7 Drawing Sheets

METHOD AND SYSTEM FOR QUANTITATIVE SUSCEPTIBILITY MAPPING RECONSTRUCTION IN LOW-FIELD MAGNETIC RESONANCE IMAGING (MRI) SYSTEM

PRIORITY CLAIM

This U.S. patent application claims priority under 35 U.S.C. § 119 to: India Application No. 202221017927, filed on Mar. 28, 2022. The entire contents of the aforementioned application are incorporated herein by reference.

TECHNICAL FIELD

This disclosure relates generally to magnetic resonance imaging (MRI) imaging systems, and more particularly to a method and system for quantitative susceptibility mapping (QSM) reconstruction in magnetic resonance imaging (MRI) systems under low-field imaging conditions.

BACKGROUND

Abnormal deposition of iron has been linked to the pathophysiological process of several neurodegenerative diseases such as Alzheimer's, Parkinson's and Huntington's disease. Quantitative susceptibility mapping (QSM) is a magnetic resonance imaging (MRI) technique that enables estimation of magnetic susceptibility of the underlying tissues. QSM allows to quantify iron concentration in the tissues as well as venous blood oxygenation. Estimation of a susceptibility map from the unwrapped phase obtained from a single scan is an ill-posed problem and suffers due to the presence of noise. One way to overcome this issue is by acquiring multiple measurements with varied orientations of the subject. However, the problem of estimating the susceptibility maps from a single orientation is an active area of research. Several reconstruction approaches have been explored for QSM starting with direct k-space inversion, conventional Bayesian iterative frameworks with suitable regularization techniques, and deep learning-based approaches. The state-of-the-art approaches have explored prior information from both magnitude and phase data.

The inventors here have recognized several technical problems with such conventional systems, as explained below. An underlying assumption is that the susceptibility maps and the magnitude images have coinciding edges. Establishing the ground-truth susceptibility maps is difficult and leads to limited applicability of supervised methods. Further, low-field imaging suffers from reduced image quality since low magnetic field results in weak NMR signals. The low-quality image reconstruction is due to the presence of noise while obtaining the measurements. The perturbations such as gradient delays, main magnetic field inhomogeneity, resonating frequency drifts cause degradation in reconstruction. Also due to weak spatial encoding gradient field, the attainable spatial resolution is limited. With all these factors combined, it becomes challenging to obtain diagnostic quality susceptibility maps under low-field imaging conditions.

SUMMARY

Embodiments of the present disclosure present technological improvements as solutions to one or more of the above-mentioned technical problems recognized by the inventors in conventional systems. For example, in one embodiment, a processor implemented method of Quantitative Susceptibility Mapping (QSM) reconstruction in magnetic resonance imaging (MRI) systems is provided. In this method, initially at least one low-field measurement of a subject is obtained as input, via one or more hardware processors. Further, the at least one low field measurement is enhanced, via the one or more hardware processors, to generate an enhanced low field measurement, using at least one pre-processing technique. Further, a magnetic resonance (MR) image is constructed by processing the enhanced low field measurement, via the one or more hardware processors. Further, perturbations from the MR image are removed by performing forward operator drift correction, via the one or more hardware processors. Further, the QSM image is reconstructed from the MR image, via the one or more hardware processors. The QSM image is reconstructed by iteratively performing the following steps. A reconstructed QSM image obtained in each iteration is compared with a reference image, to obtain a feedback representing extent of similarity of the reconstructed QSM image with the reference image, wherein the reference image is obtained by inverting the low-field measurement, further wherein the reconstructed QSM image is obtained based on an image prior enforced by an unsupervised CNN. The reconstructed QSM image from previous iteration is refined in subsequent iteration, based on the obtained feedback. Further, a similarity function is computed at each iteration, wherein the similarity function at each iteration represents extent of similarity of the reconstructed QSM image with a structural image obtained from the subject. The system terminates the iterative reconstruction when the extent of similarity represented by the similarity function exceeds a threshold.

In another aspect, a system for Quantitative Susceptibility Mapping (QSM) reconstruction is provided. The system includes one or more hardware processors, a communication interface, and a memory storing a plurality of instructions. The plurality of instructions when executed, cause the one or more hardware processors to obtain at least one low-field measurement of a subject as input. Further, the at least one low field measurement is enhanced, via the one or more hardware processors, to generate an enhanced low field measurement, using at least one pre-processing technique. Further, a magnetic resonance (MR) image is constructed by processing the enhanced low field measurement, via the one or more hardware processors. Further, perturbations from the MR image are removed by performing forward operator drift correction, via the one or more hardware processors. Further, the QSM image is reconstructed from the MR image, via the one or more hardware processors. The QSM image is reconstructed by iteratively performing the following steps. A reconstructed QSM image obtained in each iteration is compared with a reference image, to obtain a feedback representing extent of similarity of the reconstructed QSM image with the reference image, wherein the reference image is obtained by inverting the low-field measurement, further wherein the reconstructed QSM image is obtained based on an image prior enforced by an unsupervised CNN. The reconstructed QSM image from previous iteration is refined in subsequent iteration, based on the obtained feedback. Further, a similarity function is computed at each iteration, wherein the similarity function at each iteration represents extent of similarity of the reconstructed QSM image with a structural image obtained from the subject. The system terminates the iterative reconstruction when the extent of similarity represented by the similarity function exceeds a threshold.

In yet another aspect, a non-transitory computer readable medium for Quantitative Susceptibility Mapping (QSM) reconstruction is provided. The non-transitory computer readable medium includes a plurality of instructions, which when executed, cause the one or more hardware processors to perform the QSM reconstruction involving the following steps. Initially at least one low-field measurement of a subject is obtained as input, via one or more hardware processors. Further, the at least one low field measurement is enhanced, via the one or more hardware processors, to generate an enhanced low field measurement, using at least one pre-processing technique. Further, a magnetic resonance (MR) image is constructed by processing the enhanced low field measurement, via the one or more hardware processors. Further, perturbations from the MR image are removed by performing forward operator drift correction, via the one or more hardware processors. Further, the QSM image is reconstructed from the MR image, via the one or more hardware processors. The QSM image is reconstructed by iteratively performing the following steps. A reconstructed QSM image obtained in each iteration is compared with a reference image, to obtain a feedback representing extent of similarity of the reconstructed QSM image with the reference image, wherein the reference image is obtained by inverting the low-field measurement, further wherein the reconstructed QSM image is obtained based on an image prior enforced by an unsupervised CNN. The reconstructed QSM image from previous iteration is refined in subsequent iteration, based on the obtained feedback. Further, a similarity function is computed at each iteration, wherein the similarity function at each iteration represents extent of similarity of the reconstructed QSM image with a structural image obtained from the subject. The system terminates the iterative reconstruction when the extent of similarity represented by the similarity function exceeds a threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
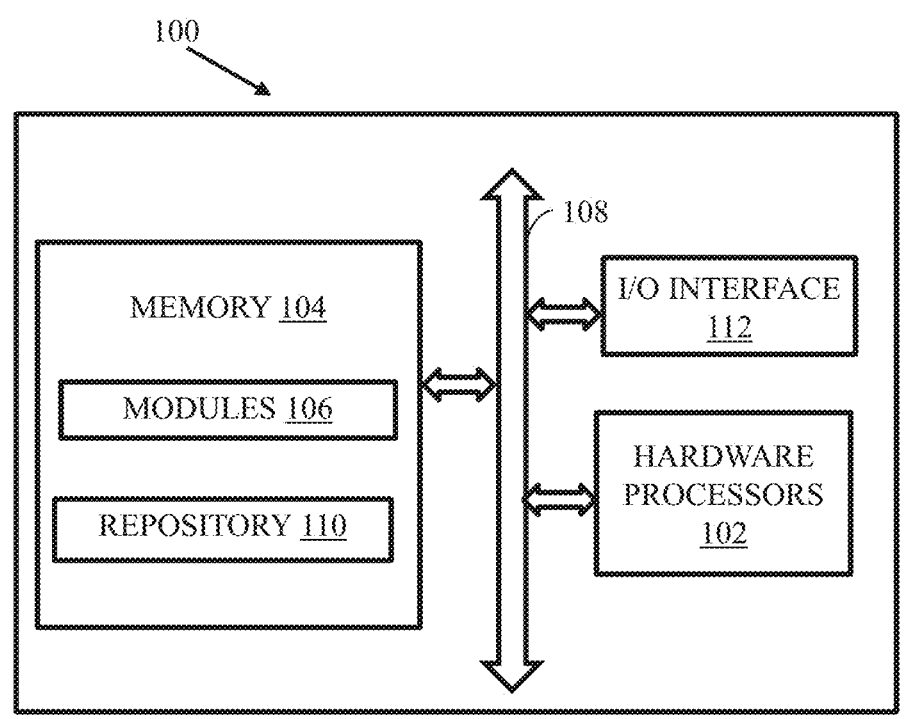
FIG. 1 illustrates an exemplary system for Quantitative susceptibility mapping (QSM) reconstruction, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

QSM allows to quantify iron concentration in the tissues as well as venous blood oxygenation. Estimation of a susceptibility map from the unwrapped phase is an ill-posed problem and suffers in the presence of noise. One way to overcome this issue is by acquiring multiple measurements with varied orientations of the object of interest. However, the problem of estimating the susceptibility maps from a single orientation is an active area of research. Several reconstruction approaches have been explored for QSM starting with direct k-space inversion, conventional Bayesian iterative frameworks with suitable regularization techniques, and deep learning-based approaches. The state-of-the-art approaches have explored prior information from both magnitude and phase data. However, the underlying assumption is that the susceptibility maps and the magnitude images have coinciding edges. Establishing the ground-truth susceptibility maps is difficult and leads to limited applicability of supervised methods.

Embodiments disclosed herein refer to a method and system for QSM reconstruction to address the aforementioned challenges/disadvantages of the state of the art systems.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 illustrates an exemplary system for Quantitative susceptibility mapping (QSM) reconstruction, according to some embodiments of the present disclosure.

The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the QSM reconstruction, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the QSM reconstruction.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagram FIG. 2, the example implementation in FIG. 3, and the example figures in FIGS. 4 through 6.

Figure 2A:
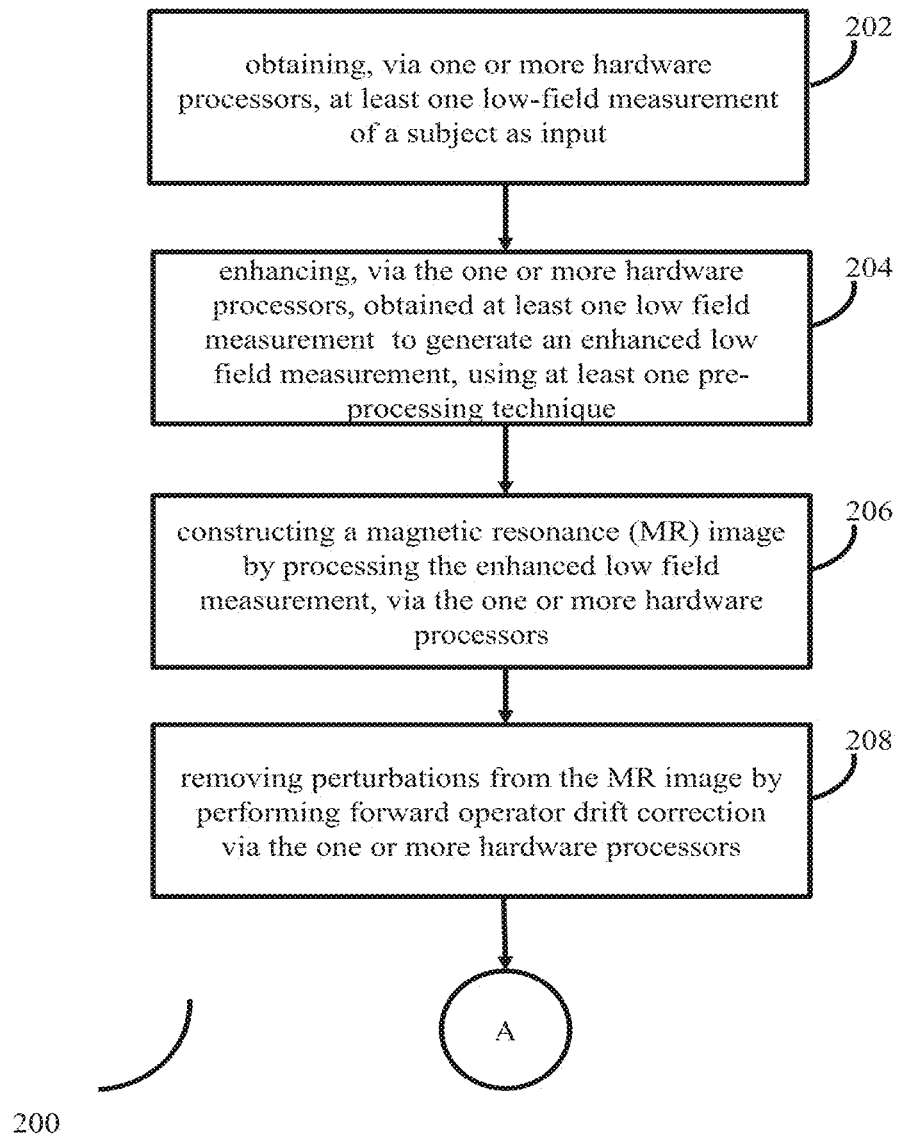
FIGS. 2A and 2B (collectively referred to as FIG. 2) is a functional block diagram according to some embodiments of the present disclosure.
Figure 2B:
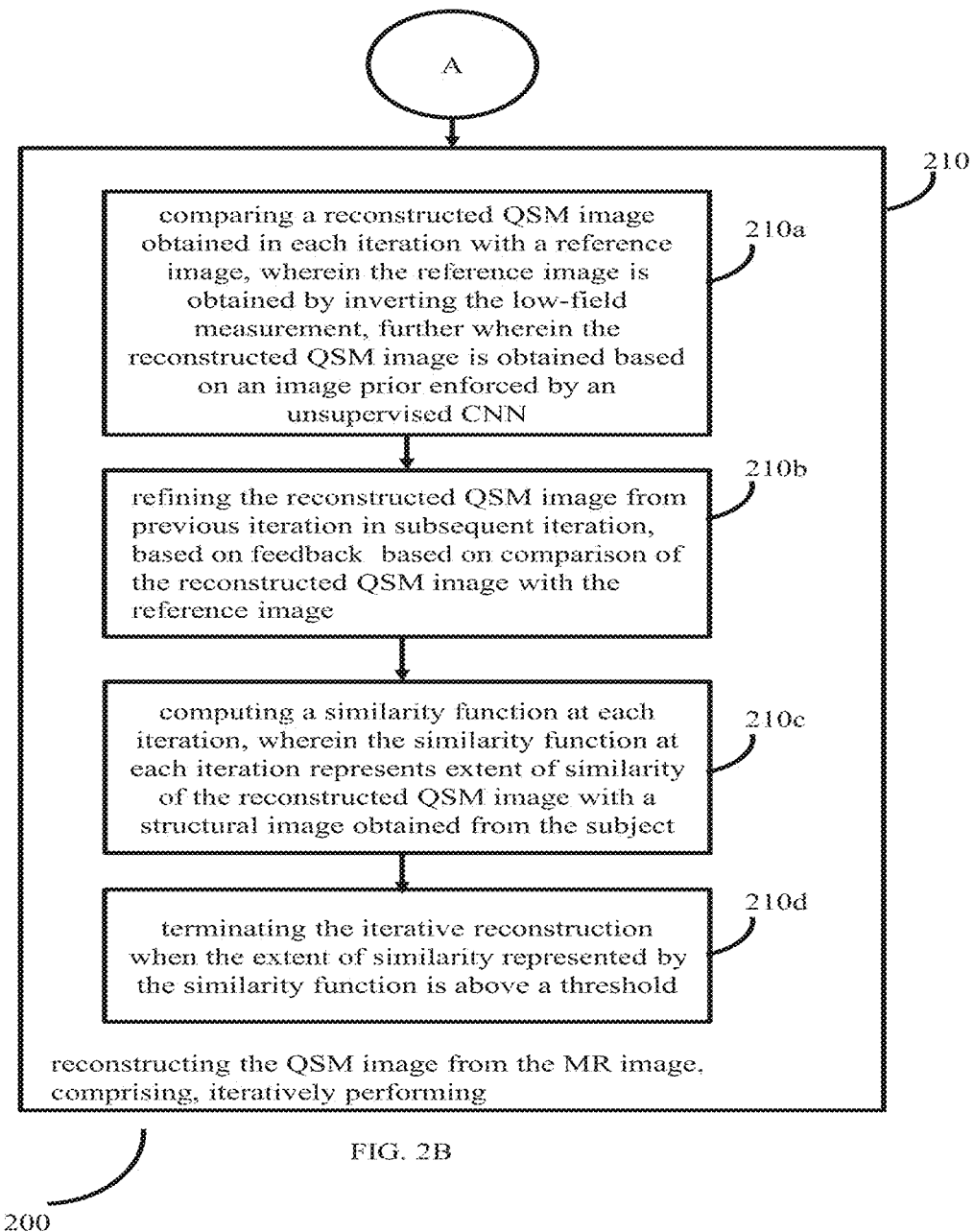

FIGS. 2A and 2B (collectively referred to as FIG. 2) is a functional block diagram according to some embodiments of the present disclosure.

At step 202 of a method 200 depicted in FIG. 2, the system 100 obtains, via one or more hardware processors, at least one low-field measurement of a subject as input. The term 'low-field' refers to the fact that low intensity magnetic field is used for MRI imaging of the subject. Further, at step 204 of the method 200, the system 100 enhances, via the one or more hardware processors, the obtained at least one low field measurement to generate an enhanced low field measurement, using at least one pre-processing technique. Enhancing may mean pre-processing of the input data to improve/boost quality of the input, and may involve steps such as but not limited to normalization, and outlier removal. Further, at step 206 of the method 200, the system 100 constructs a magnetic resonance (MR) image by processing the enhanced low field measurement, via the one or more hardware processors. Further, at step 208 of the method 200, the system 100 removes perturbations from the MR image by performing forward operator drift correction, via the one or more hardware processors. Further, at step 210 of the method 200, the system 100 reconstructs the QSM image from the MR image, via the one or more hardware processors. The QSM image is reconstructed by iteratively performing the following steps. At step 210a, a reconstructed QSM image obtained in each iteration is compared with a reference image, to obtain a feedback representing extent of similarity of the reconstructed QSM image with the reference image, wherein the reference image is obtained by inverting the low-field measurement, further wherein the reconstructed QSM image is obtained based on an image prior enforced by an unsupervised CNN. The feedback may be used as a mathematical loss function to update the weights of the unsupervised CNN. Input to the unsupervised CNN for enforcing the image prior is the structural image of the subject. Further, at step 210b, the system 100 refines the reconstructed QSM image from previous iteration in subsequent iteration, based on feedback based on comparison of the reconstructed QSM image with the reference image. Further, at step 210c, a similarity function is computed at each iteration, wherein the similarity function at each iteration represents extent of similarity of the reconstructed QSM image with a structural image obtained from the subject. Further, at step 210d, the system 100 terminates the iterative reconstruction when the extent of similarity represented by the similarity function is above a threshold.

The system 100 uses the loss function to address non-uniformity in the input data, wherein the loss function is represented using the equation:

$$\|N(F^H D F f_{\theta_t}(z) - \phi)\|_2^2 + \alpha \|f_{\theta_t}(z) - \chi_{il}\|_2^2 \tag{1}$$

wherein, N is the noise matrix which accounts for non-uniformity, F and $F^H$ are Fourier transform and it's Hermetian, D is the dipole kernel. $f_\theta(\cdot)$ is the deep neural network parameterised by $\theta$, $\phi$ is the MR phase, and $\chi$ is the susceptibility map. The noise matrix N is estimated using a low-resolution scan. The noise matrix N is a diagonal matrix with entries $$\frac{1}{\sigma_d^2},$$

where $\sigma_d^2 = (\sigma_{kx})_d^2 + (\sigma_{ky})_d^2$.

The diagonal matrix has been used because the noise in MRI phase can be modelled as Gaussian only when SNR is high. Under low-field imaging, along with low SNR, the noise properties are non-uniform due to various physical properties and interference. To handle the non-uniformity, the loss function has been modified to accommodate a weight matrix N which is computed using a fast low-resolution scan. The overall loss function is the linear combination of two terms. First term corresponds to comparing the estimated phase with the measured phase and the second term compares the estimated susceptibility image with the susceptibility image from the ith iteration. The term \theta_i indicates the parameters for the ith iteration.

Figure 3:
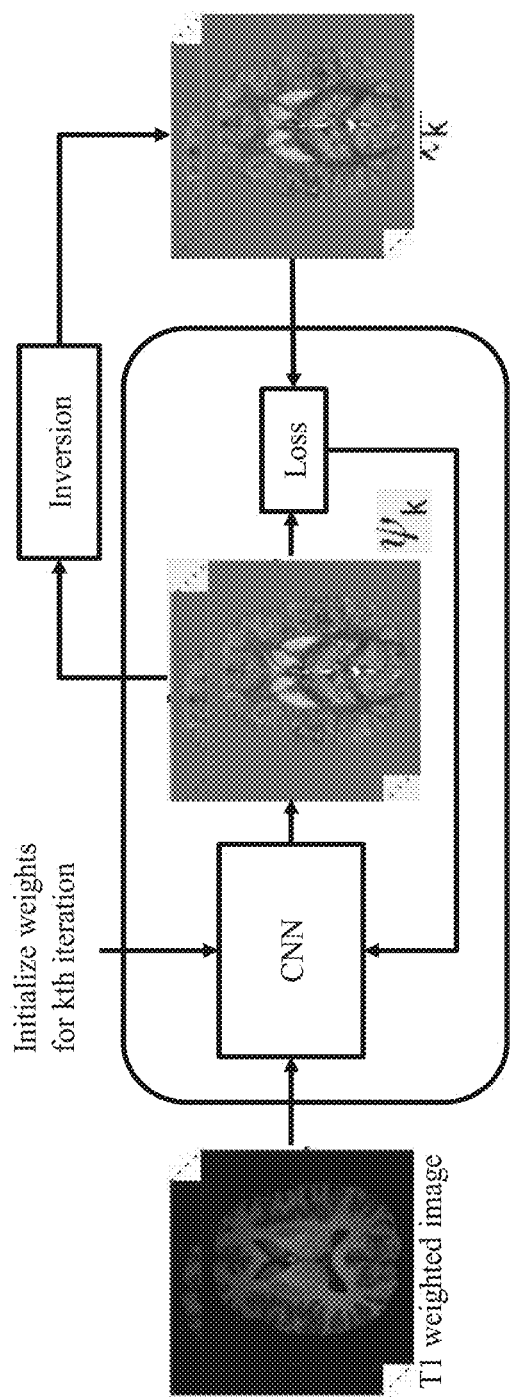
FIG. 3 is an example two loop implementation of the system of FIG. 1, for the QSM reconstruction, in accordance with some embodiments of the present disclosure.

Working of the system 100 for the QSM reconstruction is explained with reference to the example implementation and architecture in FIG. 3. Let ? be tissue magnetic susceptibility, and ? be a measured tissue phase. A forward model of the system in FIG. 3 is expressed as:

$$\Pi = F^H D F_\chi + \eta \qquad (2)$$

Where, F is Fourier transform, $\eta$ is noise, and D is dipole kernel. The dipole kernel in Fourier space is assuming the magnetic field to be along z axis, and is given as:

$$D = \frac{1}{3} - \frac{k_z^2}{k_x^2 + k_y^2 + k_z^2}, \qquad (3)$$

where, $k_z$, $k_y$, $k_x$ are k-space values along z, y, and x axes.
In a Bayesian setting, optimal susceptibility map $\chi$ can be obtained as maximum a posteriori (MAP) estimate of (1), by solving:

$$\hat{\chi} = \underset{x}{\mathrm{argmin}}\, \frac{1}{2} \| F^H D F_\chi - \phi \|^2 + \lambda g(\chi), \qquad (4)$$

where, the term $$\frac{1}{2} \| F^H D F_\chi - \phi \|^2$$

is data fidelity term which ensures measurement consistency, $g(\chi)$ is a suitable regularizer, and $\lambda$ is a regularization parameter that determines prior strength. To solve equation (4), an appropriate variable splitting technique such as but not limited to half quadratic splitting (HQS) is used, which minimizes the following cost function:

$$\mathcal{L}(\chi, \psi) = \frac{1}{2} \| F^H D F_\chi - \phi \|^2 + \lambda g(\psi) + \frac{\mu}{2} \| \chi - \psi \|^2 \qquad (5)$$

Where, $\psi$ is auxiliary variable. Equation (4) is solved using the following iterative scheme:

$$\chi_k = \underset{\chi}{\mathrm{argmin}}\, \| F^H D F_\chi - \phi \|^2 + \mu \| \chi - \psi_{k-1} \|^2 \qquad (6)$$

$$\chi_k = \underset{\psi}{\mathrm{argmax}}\, \frac{1}{2(\sqrt{\lambda/\mu})^2} \| \chi_k - \psi \|^2 + g(\psi) \qquad (7)$$

As the data fidelity and regularization terms are decoupled, the sub-problems in the above equations can be independently solved. Equation (6) corresponding to the forward operator $F^H D F_\chi$ has a closed form solution given as:

$$\chi_k = \frac{\mathcal{F}^{-1}(\mathcal{F}^-(d)\mathcal{F}(\phi) + \alpha_k \mathcal{F}(\psi_{k-1}))}{\mathcal{F}^-(d)\mathcal{F}(d) + \alpha_k} \qquad (8)$$

Where, $\mathcal{F}(\cdot)$ and $\mathcal{F}^{-1}(\cdot)$ denote forward and inverse Fourier transform, d is the dipole kernel in image domain, and $\alpha_k$ is a gradually decreasing sequence which is determined by $\alpha_k = \lambda \sigma^2 / \sigma_k$.

Equation (7) corresponds to denoising $\psi$ corrupted with a Gaussian noise of level $\sqrt{\lambda/\mu}$. With a denoiser $D_k$ corresponding to $k^{th}$ iteration, equation (7) can be rewritten as $\psi_k = D_k(\chi_k)$. $D_k$ may be any suitable denoiser which introduces the prior.

The system 100 may be configured to view the denoising problem as a regularized inverse problem, and may be represented as:

$$x^* = \underset{x}{\mathrm{argmin}}\, \| x - x_0 \|^2 + R(x) \qquad (9)$$

The regularizer R(x) can be replaced by implicit prior captured by a network performing $x = f_\theta(z)$, leading to the optimization problem:

$$\underset{\theta}{\min}\, \| f_\theta(z) - x_0 \|^2 \qquad (10)$$

Where, $\theta$ represents network characters, z is input image to network, which may be plane noise as well.

The implementation (alternately referred to as "network") in FIG. 3 obtains the noise/noisy image/image by performing inversion of the low field measurement obtained as input. The network uses the structural MRI image of the subject as the prior information to condition the input data.

In an embodiment, to further enhance resolution of the reconstructed QSM image, the system 100 may use a super-resolution technique, thus obtaining a high resolution image. Having the high resolution eases diagnosis of diseases from the image.

In an embodiment, the system 100 may be implemented in the form of a plug-and-play iterative image reconstruction, which can be connected with state of the art low-field MRI imaging systems using appropriate interface(s), so as to improve quality of the reconstructed image. In another embodiment, the system 100 may be implemented as a stand-alone system that accepts low-field image data as input and performs the reconstruction, without having to connect be connected directly to the imaging systems.

Experimental Data and Results:

In the experiments conducted, the method 200 was evaluated on a synthetically generated digital phantom in silico data. Within a desired reconstruction grid, different geometric structures (three spheres and three cuboids) with varying sizes and locations were generated and within each structure, uniform values in the range of practical susceptibility values, i.e., [−0.1, 0.1] were added. The tissue phase data was generated by convolving the ground truth susceptibility map with the dipole kernel suited for the desired reconstruction grid 160*160*160. Gaussian noise was added to the phase data to simulate practical acquisition scenarios.

The in vivo data consisted of a single orientation gradient-echo images of a healthy subject. The data was acquired with a 3 T system with an isotropic resolution of 1.06 mm. The ground truth reference susceptibility map was computed using the susceptibility tensor imaging algorithm. For a fair comparison, the phase data was simulated using the physical forward model and random Gaussian noise was added.

The method 200 was compared against four other methods, which use single orientation phase data for computing the susceptibility maps: (i) thresholded k-space division (TKD), (ii) regularization by '2 norm of the gradient, (iii) 3D total variation (TV) which enforces a smoothed '1 norm on the gradients, and (iv) BM4D denoiser within the HQS framework (BM4D-HQS). For quantitative comparison, relative root mean squared error (RRMSE) was used. RRMSE between two images a and b is defined as RRMSE (a, b):=$\|a-b\|_F/\|a\|_F$, $\|\bullet\|_F$ denotes Frobenius norm.

Figure 4:
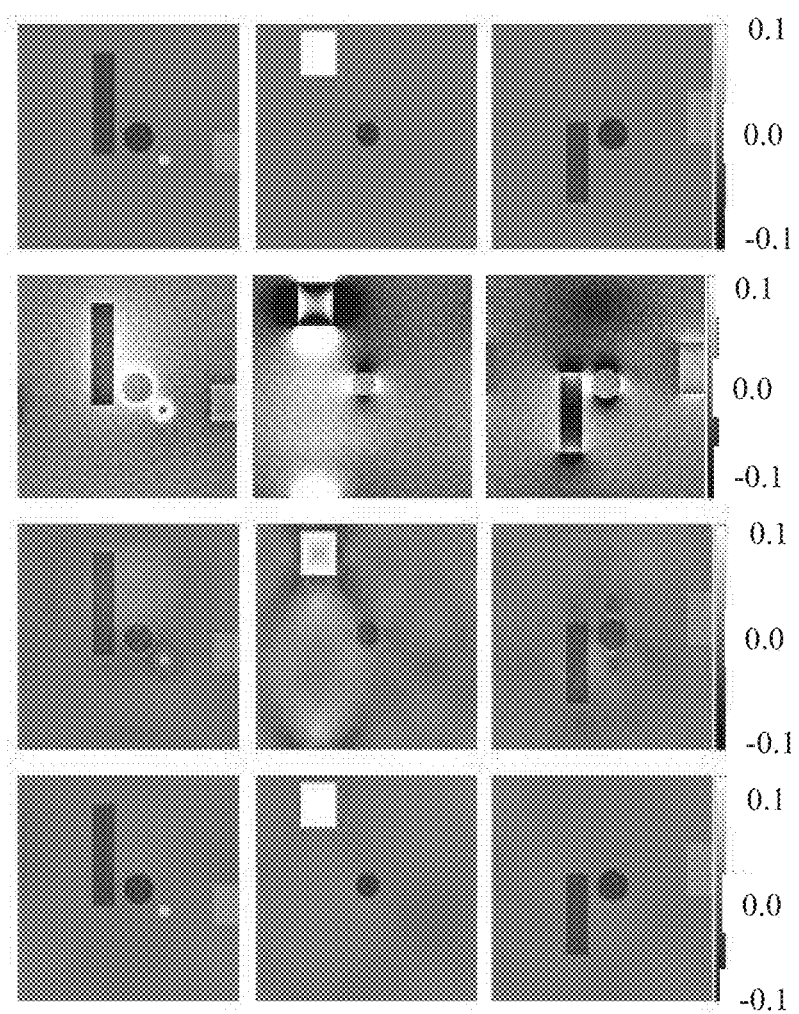
FIG. 4 depicts a first example of validation of the QSM reconstruction by the system of FIG. 1, using different training datasets, according to some embodiments of the present disclosure.
Figure 6:
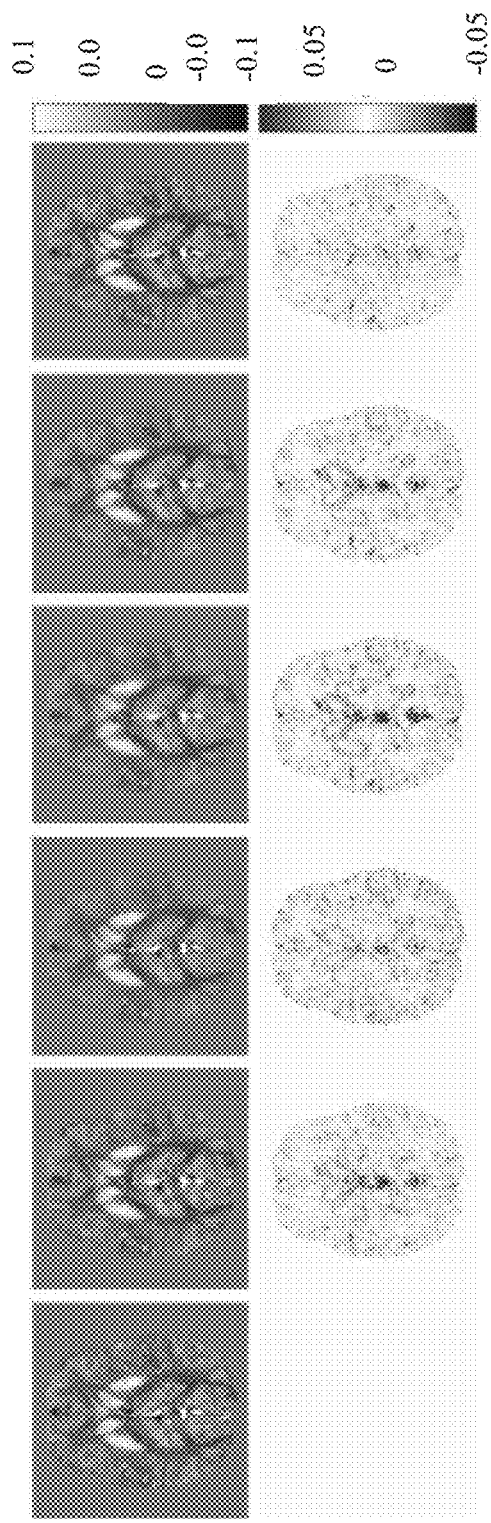
FIG. 6 depicts a third example of validation of the QSM reconstruction by the system of FIG. 1, using different training datasets, according to some embodiments of the present disclosure.

FIG. 4 shows the results obtained on the synthetic digital phantom data. The tissue phase was corrupted with 5% zero-mean Gaussian noise. The reconstructed image using TKD suffered from severe streaking artifacts and retained significant amount of noise making it difficult to distinguish closely placed structures. On the other hand, the method 200 was able to restore the fine-scale structures as well as overall regularity without causing artifacts. FIG. 6 shows the results obtained on the in vivo data. Both 3D TV and BM4D within the HQS framework improved over the method that enforces '2 norm on the gradient of the image. The quality of the images using TKD and the '2 gradient norm are comparable. On the other hand, the method 200 was found to be restoring both gradients and textural features and was closest to the ground truth image. This is reflected in the residual maps where the method 200 was shown to have the least bias and the other methods showed a strong structural presence. While the residual magnitude was evenly spread for the TV method, the higher residual magnitudes were found in the caudatea and the thalamus region for the BM4D method with reduced residuals in other regions of the brain.

Figure 5:
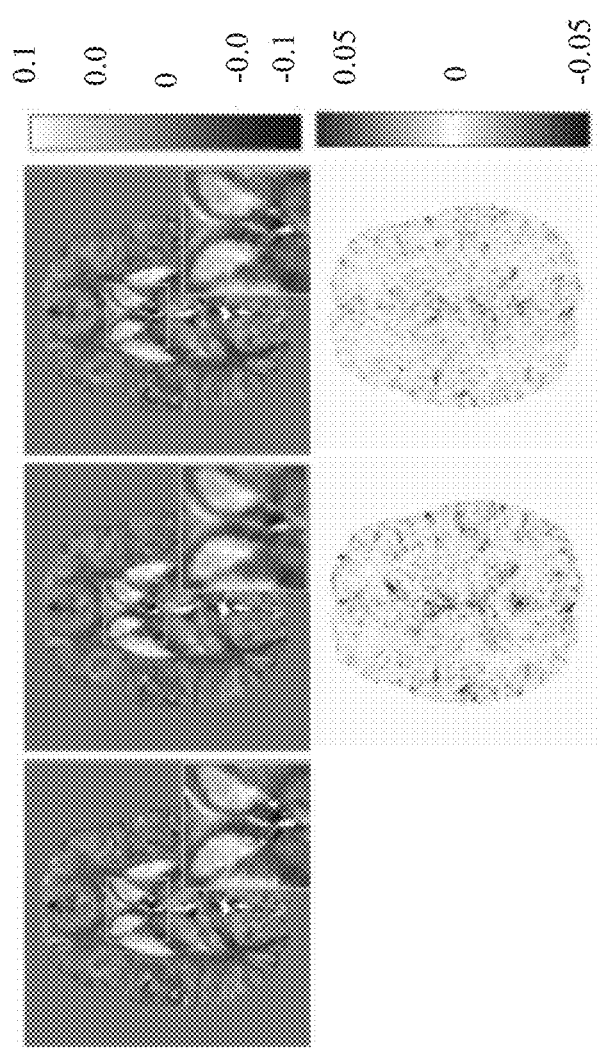
FIG. 5 depicts a second example of validation of the QSM reconstruction by the system of FIG. 1, using different training datasets, according to some embodiments of the present disclosure.

FIG. 5 compares the output of the system 100 with two different inputs to the CNN denoiser: (i) with random noise as input as originally proposed for the DIP, and (ii) using the T1 MPRAGE as conditioned input to the CNN. The zoomed insets show the caudate nuclei region where the noise as input method is quite blurry and the method 200 restores sharper features and is closer to the ground truth. Additionally, it was observed that for the same number of iterations, the resulting image with T1 information has enhanced finer structures such as gyri and sulci. This was also conveyed by the absence of a clearly distinguishable structures in the residual image. On the other hand, when noise is used as input, such finer structures were not restored completely and there is stronger bias (as reflected in the residual) compared to the method 200.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of low-field MRI imaging. The embodiment, thus provides a method and system for QSM reconstruction in MRI imaging. Moreover, the embodiments herein further provide a mechanism for QSM reconstruction by using same subject's MRI data as prior information.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of Quantitative Susceptibility Mapping (QSM) reconstruction in magnetic resonance imaging (MRI) systems, comprising:
   obtaining, via one or more hardware processors, at least one low-field measurement of a subject as input, wherein the at least one low-field measurement refers to low-field MRI imaging of the subject;
   enhancing, via the one or more hardware processors, obtained at least one low-field measurement to generate an enhanced low-field measurement, using at least one pre-processing technique;
   constructing a magnetic resonance (MR) image by processing the enhanced low-field measurement, via the one or more hardware processors;
   removing perturbations from the MR image by performing forward operator drift correction, via the one or more hardware processors; and
   reconstructing QSM image from the MR image, via the one or more hardware processors, comprising, iteratively performing:
      comparing a reconstructed QSM image obtained in each iteration with a reference image to obtain a feedback representing extent of similarity of the reconstructed QSM image with the reference image, wherein the reference image is obtained by inverting the low-field measurement, further wherein the reconstructed QSM image is obtained based on an image prior enforced by an unsupervised CNN, and wherein the feedback is used as a loss function to update weights of the unsupervised CNN;

refining the reconstructed QSM image from previous iteration in subsequent iteration, based on the obtained feedback;

computing a similarity function at each iteration, wherein the similarity function at each iteration represents extent of similarity of the reconstructed QSM image with a structural image obtained from the subject; and terminating the iterative reconstruction when the extent of similarity represented by the similarity function exceeds a threshold, wherein the loss function is used to address non-uniformity in input data, wherein the loss function is represented using an equation $$\|N(F^H D F f_{\theta_i}(z)-\phi)\|_2^2 + \alpha\|f_{\theta_i}(z)-\chi_i\|_2^2$$

wherein, N is a noise matrix which accounts for non-uniformity, F and $F^H$ are Fourier transform and it's Hermetian, D is a dipole kernel, $f_\theta(\cdot)$ is a deep neural network parameterized by $\theta$, $\phi$ is a MR phase, and $\chi$ is a susceptibility map.

2. The method of claim 1, wherein input to the unsupervised CNN for enforcing the image prior is the structural image of the subject.

3. A system for Quantitative Susceptibility Mapping (QSM) reconstruction, comprising:

one or more hardware processors;

a communication interface; and memory storing a plurality of instructions, which when executed, cause the one or more hardware processors to:

obtain at least one low-field measurement of a subject as input, wherein the at least one low-field measurement refers to low-field MRI imaging of the subject;

enhance obtained at least one low-field measurement to generate an enhanced low-field measurement, using at least one pre-processing technique;

construct a magnetic resonance (MR) image by processing the enhanced low-field measurement;

remove perturbations from the MR image by performing forward operator drift correction; and reconstruct QSM image from the MR image, by iteratively performing:

comparing a reconstructed QSM image obtained in each iteration with a reference image, to obtain a feedback representing extent of similarity of the reconstructed QSM image with the reference image, wherein the reference image is obtained by inverting the low-field measurement, further wherein the reconstructed QSM image is obtained based on an image prior enforced by an unsupervised CNN, and wherein the feedback is used as a loss function to update weights of the unsupervised CNN;

refining the reconstructed QSM image from previous iteration in subsequent iteration, based on the obtained feedback;

computing a similarity function at each iteration, wherein the similarity function at each iteration represents extent of similarity of the reconstructed QSM image with a structural image obtained from the subject; and terminating the iterative reconstruction when the extent of similarity represented by the similarity function exceeds a threshold, wherein the one or more hardware processors are configured to use the loss function to address non-uniformity in input data, wherein the loss function is represented using an equation $$\|N(F^H D F f_{\theta_i}(z)-\phi)\|_2^2 + \alpha\|f_{\theta_i}(z)-\chi_i\|_2^2$$

wherein N is a noise matrix which accounts for non-uniformity, F and $F^H$ are Fourier transform and it's Hermetian, D is a dipole kernel, $f_\theta(\cdot)$ is a deep neural network parameterized by $\theta$, $\phi$ is a MR phase, and $\chi$ is a susceptibility map.

4. The system of claim 3, wherein input to the unsupervised CNN for enforcing the image prior is the structural image of the subject.

5. One or more non-transitory machine-readable information storage mediums comprising one or more instructions which when executed by one or more hardware processors cause:

obtaining at least one low-field measurement of a subject as input, wherein the at least one low-field measurement refers to low-field MRI imaging of the subject;

enhancing obtained at least one low-field measurement to generate an enhanced low-field measurement, using at least one pre-processing technique;

constructing a magnetic resonance (MR) image by processing the enhanced low-field measurement;

removing perturbations from the MR image by performing forward operator drift correction; and reconstructing QSM image from the MR image, comprising, iteratively performing:

comparing a reconstructed QSM image obtained in each iteration with a reference image to obtain a feedback representing extent of similarity of the reconstructed QSM image with the reference image, wherein the reference image is obtained by inverting the low-field measurement, further wherein the reconstructed QSM image is obtained based on an image prior enforced by an unsupervised CNN, and wherein the feedback is used as a loss function to update weights of the unsupervised CNN;

refining the reconstructed QSM image from previous iteration in subsequent iteration, based on the obtained feedback;

computing a similarity function at each iteration, wherein the similarity function at each iteration represents extent of similarity of the reconstructed QSM image with a structural image obtained from the subject; and terminating the iterative reconstruction when the extent of similarity represented by the similarity function exceeds a threshold, wherein the loss function is used to address non-uniformity in input data, wherein the loss function is represented using an equation $$\|N(F^H D F f_{\theta_i}(z)-\phi)\|_2^2 + \alpha\|f_{\theta_i}(z)-\chi_i\|_2^2$$

wherein, N is a noise matrix which accounts for non-uniformity, F and $F^H$ are Fourier transform and it's Hermetian, D is a dipole kernel, $f_\theta(\cdot)$ is a deep neural network parameterized by $\theta$, $\phi$ is a MR phase, and $\chi$ is a susceptibility map.

6. The One or more non-transitory machine-readable information storage mediums of claim 5, wherein input to the unsupervised CNN for enforcing the image prior is the structural image of the subject.

* * * * *